Jan. 17, 1939.  C. E. RUTHERFORD  2,144,391
ELECTRICAL CONDUIT FITTING
Filed Aug. 22, 1936
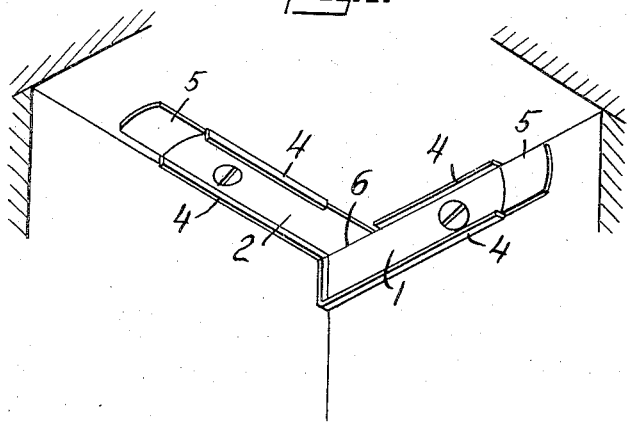
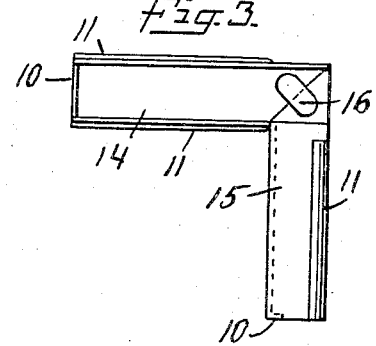
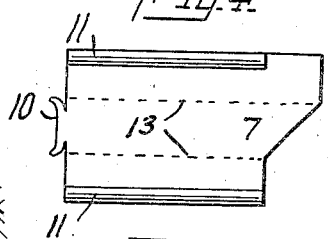
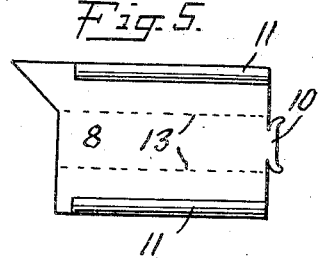
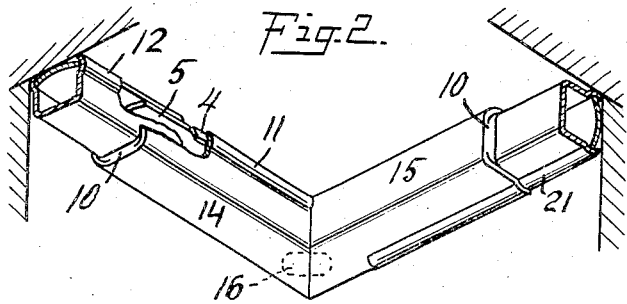
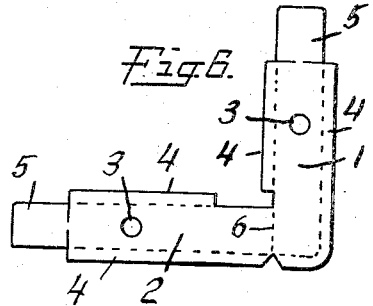
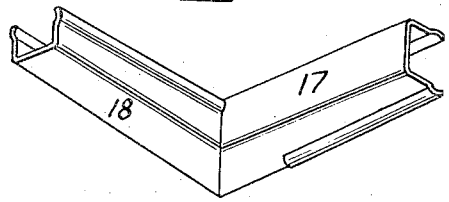
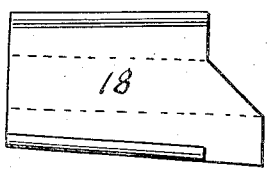
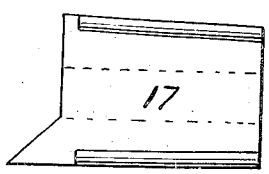
INVENTOR
Charles E. Rutherford
BY
*Pennie, Davis, Marvin & Edmonds*
ATTORNEYS Patented Jan. 17, 1939

2,144,391

UNITED STATES PATENT OFFICE 2,144,391

ELECTRICAL CONDUIT FITTING

Charles E. Rutherford, West Hartford, Conn., assignor to The Wiremold Company, Hartford, Conn., a corporation of Connecticut Application August 22, 1936, Serial No. 97,329

2 Claims. (Cl. 247—31)

This invention relates to electrical conduit fittings, and has for its object the provision of improved elbow fittings. More particularly, this invention contemplates the provision of an improved internally twisted elbow fitting for electrical conduits.

In wiring or rewiring buildings the conductors are required to be protected from mechanical injury by some form of metal conduit. This is particularly so when the wiring is to be done on the surface of the walls or ceilings. In order to prevent unsightly bends and turns in the conduits, neat and compact elbows and fittings are necessary.

Frequently it is necessary to run the conduit on one surface and then make a turn onto an adjacent surface which requires a twist as well as a right angle turn. Such a condition is present when the conduit is run vertically on one wall and the direction then changed to the horizontal on an adjacent wall. Another case requiring such an elbow would be a run of conduit on the ceiling to a side wall with the run extending horizontally on the side wall.

The problem of manufacturing a simple and inexpensive elbow fitting of this nature has existed for a long time in the art of electrical conduits, but heretofore no satisfactory and acceptable solution has been advanced and therefore such a fitting has never been made. It is readily apparent that elbow fittings having right and left hand twists are necessary to accommodate all possible conditions.

The elbow fitting of this invention is of remarkably simple construction and is inexpensive to manufacture. In its complete aspect, the fitting comprises two portions, a base member and a cover member. The base member consists of a single integrally-stamped portion while the cover member consists of two stamped portions of simple design suitably joined together. One of the salient advantages of the elbow fitting of this invention is that the same set of dies used in forming the base member and cover member are sufficient to produce an elbow having either a right-hand or left-hand twist.

For a further description of the details of the elbow fittings of this invention, reference is to be had to the drawing in which:

Fig. 1 is a perspective view of the base member as mounted in the corner of a room;

Fig. 2 is a perspective view of the assembled elbow fitting having a cut-away of its connection to an electrical conduit;

Fig. 3 is an underneath view of the cover member showing a proposed means for joining the two portions of the cover member;

Fig. 4 is a plan view of one stamped portion of the cover member;

Fig. 5 is a plan view of the other stamped portion of the cover member;

Fig. 6 is a plan view of the base member as stamped;

Fig. 7 is a perspective view of a modified form of cover member;

Fig. 8 is a plan view of one stamped portion of the modified form of cover member; and Fig. 9 is a plan view of the other stamped portion of the modified form of cover member.

Referring to Figs. 1 and 6 of the drawing, the base member comprises a stamped form having two legs 1 and 2 whose principal axes intersect at substantially right angles. Each leg has a screw hole 3 by means of which the base member may be suitably fastened, say, to a ceiling and sidewall. The legs are provided with appropriate projections 4 which, when bent at right angles to the base member, provide suitable sidewalls for the base member as shown in Fig. 1. Each leg is further provided with a tongue 5 bent transversely in the form of an arc whereby the tongue is adapted to engage an electrical conduit having a similarly arcuate-shaped base member. The base member is bent along dotted line 6 so that the plane of leg 1 is substantially normal to the plane of leg 2. The length of the legs of the base member are such that the lengths of the plane surfaces of the finished base member are substantially equal. The width of the legs of the finished base member is substantially equal to the internal width of the electrical conduit with which the fitting is to be associated.

The cover member comprises two legs made from stampings 7 and 8 illustrated in Fig. 4 and Fig. 5, respectively. Each stamping is provided at one end with an appropriately shaped projection 10 which closes the connection between the elbow fitting and a conduit smaller than the fitting or which may be broken off to allow a conduit of larger size to enter. The overall length of each leg, exclusive of the projection 10 is equal to the overall length of the legs of the base member of the elbow fitting. Each stamping is further provided with grooves 11 along each side thereof extending from the end having the projection 10 along a substantial part of the length of each stamping and adapted to engage the projections 12 along the side walls of an electrical conduit. The outer portions of the stampings are folded upwardly along dotted lines 13 to form channel shaped legs, the internal width of which is substantially equal to the external width of the electrical conduit with which the elbow fitting is to be associated.

The channel-shaped legs 14 and 15 of the cover member thus produced from the stampings 7 and 8 are adapted to be so connected that the principal axes of the legs intersect at right angles and that the planes of the open faces of the channel-shaped legs are substantially normal to one another as shown in Fig. 3, with the open face of one leg in a plane substantially parallel to the plane including the principal axes of both legs. That is, the legs of the cover member are perpendicular to one another while one leg has been rotated or twisted substantially 90° around its principal axis. The legs may be joined in any suitable way, advantageously by spot welding a cross member 16 on adjacent portions of the two legs of the cover member.

A modified form of cover member may be made from stampings 17 and 18 shown in Figs. 8 and 9, respectively. These forms are similar to those shown in Figs. 4 and 5 except that stampings 17 and 18 are tapered longitudinally to produce a cover member having tapered channel-shaped legs as shown in Fig. 7, the depth of the channel progressively diminishing toward the outer ends of the legs of the cover member. The smaller outer ends of the tapered legs are of proper size to engage an electrical conduit without requiring a partial end wall as on the outer end of the legs of the cover member illustrated in Fig. 2.

Stampings 7 and 8 are designed to produce an elbow fitting having a left bend. That is, when the elbow fitting is placed on a horizontal surface with the open face of one channel-shaped leg facing downward and viewed from the outer end of that leg, the other leg of the fitting extends to the left with its open face away from the person viewing it. A cover member having a right bend may be made from the same dies as stampings 7 and 8 by merely turning over those stampings, then grooving and bending them as before.

The base member stamping shown in Fig. 6 is designed for an elbow fitting having a left bend. If the stamping is turned over and then bent as before, a base member is formed which is adapted for use with an elbow fitting having a right bend.

In assembling and installing the elbow, the electrical conduits attached to the ceiling and sidewall, respectively, are cut off at a distance from the corner of the room slightly greater than the length of the walled portion of the base member legs but less than the overall length of those legs. The tongue of each leg of the base member is then inserted into each conduit and the base member fastened to the ceiling and sidewall by screws through the screw-holes provided therefor.

After the necessary wiring has been installed, one leg of the cover member is snapped over one electrical conduit, then slid along that conduit toward the corner of the room until the other leg of the cover member has engaged the second conduit.

From the foregoing, it will be seen that the invention contemplates the provision of an elbow fitting of simple construction and one which may be readily assembled. The entire fitting comprising a base member and a cover member may be manufactured with the aid of one set of dies for making three stampings, and from the three stampings there may be produced a fitting having either a right or left bend together with one leg twisted.

Fittings constructed in accordance with the invention may be employed with advantage wherever an elbow is required the legs of which must communicate with conduits attached to surfaces whose planes are substantially normal to one another, and one of which planes is substantially parallel to the plane of the principal axes of the conduits. The elbow fitting is easily designed to match and engage existing types of conduits, and, moreover, may be readily connected electrically to the balance of the conduit system for purposes of grounding.

I claim:

1. In an elbow fitting adapted for use in conjunction with wiring conduits, the improvement which comprises a cover member having two separate legs, each generally channel-shaped in cross-section, and means joining the two legs, the legs of the cover member being so joined that their principal axes intersect at an angle and that the planes of the open faces of the channel-shaped legs are at an angle to one another with the open face of one leg in a plane substantially parallel to the plane including the principal axes of both legs.

2. In an elbow fitting adapted for use in conjunction with wiring conduits, the improvement which comprises a cover member having two separate legs, each generally channel-shaped in cross-section with the depth of the channel progressively diminishing toward the outer end of each leg, and means joining the two legs, said legs of the cover member being so joined at the larger ends thereof that their principal axes are substantially perpendicular and that the planes of the open faces of the channel-shaped legs are substantially normal to one another with the open face of one leg in a plane substantially parallel to the plane including the principal axes of both legs.

CHARLES E. RUTHERFORD.